United States Patent [19]

Pelton et al.

[11] 4,338,272

[45] Jul. 6, 1982

[54] SLIP-CASTING SYSTEM

[75] Inventors: Arthur D. Pelton, St. Laurent, Canada; Michel Rivier, Palo Alto, Calif.

[73] Assignee: Canadian Patents & Development Limited, Ottawa, Canada

[21] Appl. No.: 2,736

[22] Filed: Jan. 11, 1979

[51] Int. Cl.³ .............................................. B29C 1/02
[52] U.S. Cl. ...................................... 264/86; 264/225; 264/337
[58] Field of Search .......................... 264/86, 337, 225

[56] References Cited

U.S. PATENT DOCUMENTS

| 2,809,898 | 10/1957 | Thiess | 264/86 |
| 3,641,229 | 2/1972 | Lawrence | 264/86 |
| 3,673,293 | 6/1972 | Teague | 264/86 |

OTHER PUBLICATIONS

Rivier et al., "A New Slip Casting Technique For The Laboratory Fabrication of B–Alumina and Other Ceramics", *Cer. Bull.*, vol. 57, No. 2-P. 183-185, Feb., 1978.

*Primary Examiner*—John A. Parrish
*Attorney, Agent, or Firm*—Ronald G. Bitner

[57] ABSTRACT

A slip-casting system utilizing a ceramic powder for the mold. The system facilitates casting thin-walled and/or long objects without additives for demolding.

4 Claims, 1 Drawing Figure

SLIP-CASTING SYSTEM

BACKGROUND OF THE INVENTION

This invention relates to slip-casting.

Slip-casting is a known technique for casting ceramic articles in which a finely ground ceramic in a liquid suspension, or slip, is poured into a porous mold which absorbs the liquid and leaves a layer of ceramic deposited on the mold walls. When the desired thickness of ceramic is obtained, the excess liquid is poured out. The deposited casting is allowed to dry before being removed for sintering. The conventional mold material is plaster.

The use of plaster molds for slip casting has a number of limitations. It is very difficult to obtain thin molded castings, or articles having a large contact area with the mold, without breaking or cracking. Also, many ceramics, such as $\beta$-alumina, are difficult to remove from plaster molds since the castings tend to stick to the mold walls, even with the use of additives such as glycerine or sodium alginate. Moreover, the use of additives to facilitate demolding adversely affects the purity and porosity of the article. Also, casting in plaster molds is time-consuming, the molds must be dried between castings, and must be replaced after about five castings since the pores become clogged.

SUMMARY OF THE INVENTION

It has been found that a finely ground powder of ceramic material can be utilized as a mold for slip-casting, facilitating the casting procedure and particularly facilitating the removal of the casting from the mold.

The present invention provides a slip-casting system which comprises:

- providing a powder of ceramic material, said powder having a particle size sufficiently small to provide shape retention upon compaction and retain the suspended particles of a slip, and said powder being inert to the slip;
- shaping and compacting the powder to provide a mold cavity that conforms in shape to that of a desired casting;
- introducing a slip into the mold cavity, retaining the slip for a time sufficient to form the desired thickness of the casting, and removing the remaining slip;
- allowing at least partial drying of the casting; and
- separating the casting from the powder.

DESCRIPTION OF THE PREFERRED EMBODIMENTS

Figure 1:
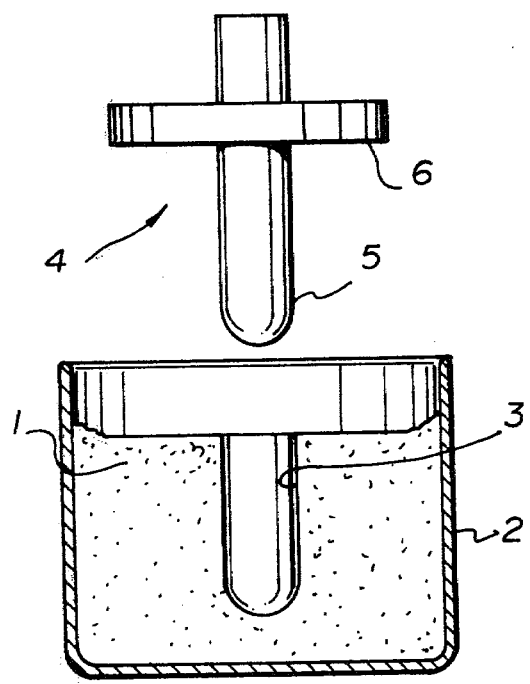
FIG. 1 is a cross-sectional view illustrating an embodiment of apparatus for the slip-casting system of the present invention.

Referring to FIG. 1, the slip-casting system of the present invention utilizes a ceramic powder 1 for the mold which is shown contained by a suitable container 2. The ceramic powder 1 has a particle size sufficiently small to retain the suspended particles of a slip and also to provide shape retention when compacted.

The mold for slip-casting is provided by shaping and compacting the powder 1 to form a cavity 3 corresponding in shape to that of the desired article. This is facilitated by introducing a suitable forming device, having a configuration similar to that of the desired casting, into the powder. The shaping and compacting device 4, as shown in FIG. 1, has a lower portion 5, which forms the cavity 3, and an upper portion 6, which compacts the powder around the cavity 3, when the device 4 is pressed into the powder 1.

After the device is withdrawn from the powder, a slip suspension is introduced into the cavity and retained for a time sufficient to form the desired casting thickness, as in conventional slip-casting practice. The remaining slip is then removed and the casting allowed to dry at least partially before separating from the mold powder.

Compacting and shaping of the powder may be achieved by various methods, in separate steps or at the same time. The operation can be performed, for example, by introducing a forming device into the powder and subsequently compacting the powder around it. With an apparatus as shown in FIG. 1, shaping and compacting takes place in the same operation. Compacting may be achieved by pressing the device into the powder and/or with the use of vibrating means.

The procedure for separating the casting from the powder mold will depend on the fragility of the casting, i.e. its thickness and hardness. A relatively thick, short casting that has been allowed to dry fully may be merely pulled from the mold. However, for a thin or long casting, or one that has not completely dried, it may be necessary to remove or loosen the compacted powder from around the article before withdrawing it. Freeing of the casting from the compacted powder may be facilitated by an arrangement whereby the confining walls of the container are removed or separated from the powder.

After removal from the powder mold the casting can be fired in the conventional manner.

In order to be operative as a mold, the ceramic powder particle size must be sufficiently small so that the suspended particles of the slip introduced into the mold cavity are retained by the powder. Also, the powder must be capable of retaining the shape of the mold cavity when compacted. It has been found that a powder which has a sufficiently small particle size to retain the suspended particles can also be made to retain shape. In the case of relatively large or very small particles which do not provide the desired degree of shape retention when dry, the shape retention properties can be enhanced by adding small amounts of liquid to the powder.

It appears that particle sizes ranging from about 0.1 $\mu$m to 1000 $\mu$m can be utilized as a mold in accordance with the present invention. The preferred range is from about 1 $\mu$m to 50 $\mu$m. Particle size within this range should not require a liquid binder to provide the required shape retention properties. Powder particle size less than about 1 $\mu$m is difficult to produce, and it appears that particle sizes less than about 0.1 $\mu$m may not be sufficiently permeable to be useful for slip-casting.

A liquid binder, if used, must be inert to, or compatible with, other materials used in the system. Specifically, it must not dissolve or react with the mold powder, or react with the slip. Preferably, the binder liquid will be the same as the slip liquid. The liquid used in the system may for example be water or alcohol.

The term ceramic powder or material, as used herein, refers to any non-metallic material, which may be non-crystalline or crystalline. Metallic material is difficult to reduce to the required particle size. Preferably, the ceramic material will be a metal oxide, for example, alumina.

For high purity of the casting, the mold powder could be composed of the same material as the slip particles.

EXAMPLE

Experiments were conducted for the fabrication of tubes of β-alumina using α-alumina powder as the mold material. The mold powder particles were ground to approximately 4 μm while the slip particles were ground to approximately 1 μm. Several liquids for the slip suspension were tried including water, alcohols, and ketones, and methanol provided the best results. It was found that additives, use in conventional slip casting to facilitate removal from the mold, tended to decrease the density of the finished product and because they were not necessary no additives were used. The optional solids content of the slip suspension was found to be just under 60% by weight, since at about 60% the viscosity increases abruptly. Tubes were cast using apparatus similar to that illustrated in the drawing. The mold was made by inserting a tube (4) into a container (2) containing the α-alumina powder (1) and compacting the powder around the tube and removing the tube leaving the cavity (3). The β-alumina slip was poured in and retained for about 1 minute to provide a tube thickness of about 1 cm. The excess suspension was poured out and the casting was allowed to dry. After drying the casting was removed by loosening or removing the mold powder from around it. The unfired castings had a density of about 60% of theoretical density. The optimum sintering conditions were found to be 1550° C. for 1½–2 hours providing a density of 98% of theoretical.

Tubes up to 50 cm. in length, from 1 to 50 mm in diameter, and from 0.1 mm to 5 mm in wall thickness were also fabricated in a similar manner. It was found that the mold powder can be reused repeatedly after drying without any adverse effects.

We claim:

1. A system for slip-casting, comprising:
   providing a powder of ceramic material, said powder having a particle size sufficiently small to provide shape retention upon compaction, and to retain suspended particles of a slip, and said powder being inert to the slip;
   shaping an compacting the powder to provide a mold cavity that conforms in shape to that of a desired casting;
   introducing a slip into said shaped and compacted powder mold cavity, retaining the slip for a time sufficient to form the desired thickness of the casting, and removing the remaining slip;
   allowing at least partial drying of the casting; and
   separating the casting from the powder.

2. The system of claim 1 wherein the particle size of the powder ranges from 0.1 μm to 1000 μm.

3. The system of claim 2 wherein the particle size of the powder ranges from 1 μm to 50 μm.

4. The system of claim 1 wherein the powder is a metal oxide.

* * * * *